United States Patent [19]

Harasaki et al.

[11] Patent Number: 5,061,009
[45] Date of Patent: Oct. 29, 1991

[54] FRONT VEHICLE BODY STRUCTURE

[75] Inventors: Hayatsugu Harasaki; Kohji Noma, both of Hiroshima, Japan

[73] Assignee: Mazda Motor Corporation, Hiroshima, Japan

[21] Appl. No.: 606,201

[22] Filed: Oct. 31, 1990

[30] Foreign Application Priority Data

| Oct. 31, 1989 | [JP] | Japan | 1-127769[U] |
| Oct. 31, 1989 | [JP] | Japan | 1-127770[U] |
| Oct. 31, 1989 | [JP] | Japan | 1-127771[U] |
| Feb. 15, 1990 | [JP] | Japan | 2-014471[U] |

[51] Int. Cl.$^5$ .............................................. B62D 25/08
[52] U.S. Cl. ..................................... 296/192; 296/194
[58] Field of Search ............... 296/192, 194, 203, 208, 296/96.21

[56] References Cited

U.S. PATENT DOCUMENTS

| 3,843,194 | 10/1974 | Yamada | 296/192 |
| 4,750,780 | 6/1988 | Harasaki et al. | 296/192 |
| 4,976,491 | 12/1990 | Hashimoto et al. | 296/192 |

FOREIGN PATENT DOCUMENTS

| 7767 | 1/1982 | Japan | 296/192 |
| 64-39179 | 3/1989 | Japan | |

Primary Examiner—Johnny D. Cherry
Assistant Examiner—Joseph D. Pape

[57] ABSTRACT

In a front vehicle body structure in which a cowl front panel, which comprises an arcuated glass support portion for supporting a front window glass so that the glass support portion is located behind a dash lower panel at two side portions in the widthwise direction of a vehicle, and is located in front of the dash lower panel at a central portion in the widthwise direction of the vehicle, extends along the widthwise direction of the vehicle in a front portion of the vehicle, the cowl front panel is split into three members including two side split members and one central split member at positions where the glass support portion intersects the dash lower panel, and the two side split portions and one central split member are joined at the intersections.

18 Claims, 10 Drawing Sheets

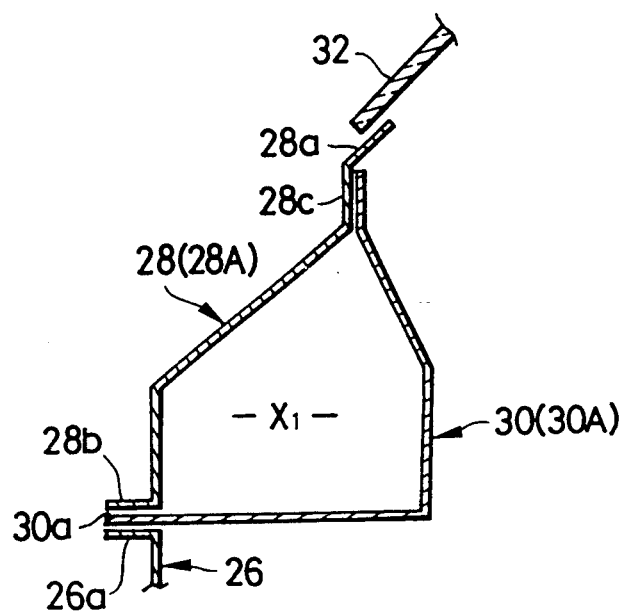
Fig. 8A
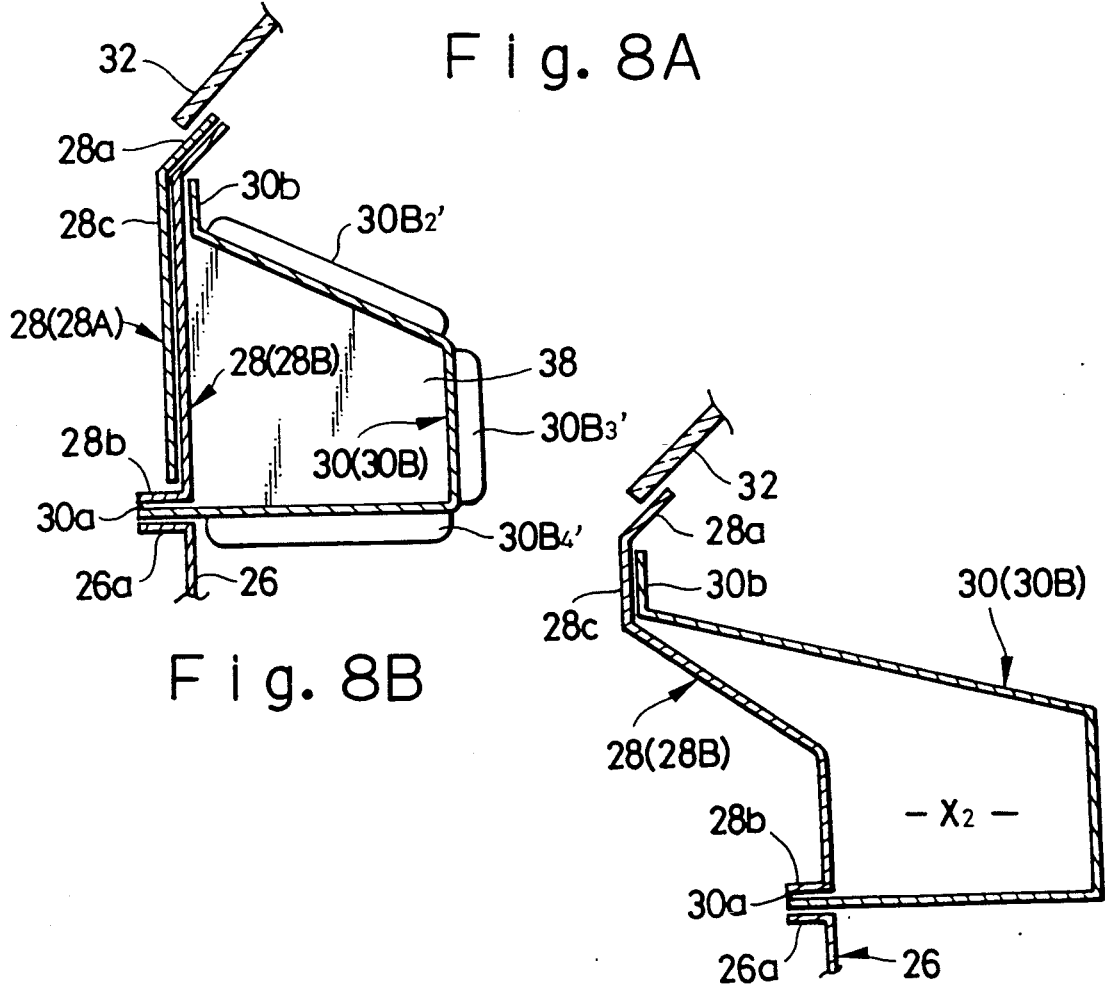
Fig. 8B
Fig. 8C

FRONT VEHICLE BODY STRUCTURE

BACKGROUND OF THE INVENTION

The present invention relates to a front vehicle body structure centering around a cowl front panel disposed in the widthwise direction of a vehicle on a front portion of the vehicle.

In general, in a front vehicle body structure, an engine room and a passenger's room are partitioned by a dash lower panel. A cowl front panel extending in the widthwise direction of a vehicle is joined to an upper portion of the dash lower panel. The cowl front panel supports a lower portion of a front glass at its upper edge portion. A dash upper panel is joined to the cowl front panel to form a closed space. This closed space defines a space where, for example, a duct for guiding air extracted from outer air toward a predetermined air-conditioning system is formed.

As a front vehicle body structure centering around a cowl front panel, a cockpit unit mounting structure for a vehicle is disclosed in Japanese Utility Model Laid-Open No. 64-39179. A glass support portion of a cowl front panel is located either behind or in front of a dash lower panel, as disclosed in the above reference.

A front glass is required to have a large curvature in order to improve an outer appearance or to reduce an air resistance of a vehicle body. In order to support a lower portion of a front glass having a large curvature, two side portions of the glass support portion of the cowl front panel must be bent toward the rear side of the dash lower panel, and a central portion thereof must be bent toward the front side of the dash lower panel. That is, the glass support portion must be worked to match with the curved glass.

However, it is not easy to precisely work one cowl front panel to be bent in different directions. Therefore, the above-mentioned requirement for increasing the curvature of the front glass cannot be satisfactorily met.

Since the cowl front panel is considerably heavy since it has a length corresponding to the vehicle width, as described above. For this reason, workability upon assembly with this cowl front panel poses another problem.

A method of fixing two side portions of a dash upper panel to inner members of corresponding front pillars of a vehicle body by welding is known. In an assembly of respective members in a vehicle body structure, after a dash lower panel is disposed, front pillars (to which hinge pillars have already been joined) are assembled to a vehicle body from side portions of the vehicle body, and then, a cowl front panel and a dash upper panel are joined by welding.

In each front pillar, inner and outer members have already been joined. For this reason, when the dash upper panel is joined to the front pillar inner members, spot welding cannot be performed. Therefore, since fillet welding is performed in place of spot welding, a sufficient joint strength cannot be assured, and rigidity of a vehicle body cannot be improved.

Since the dash upper panel has a length corresponding to the vehicle width and is relatively large and heavy, as described above, its transportation is not easy.

An air inlet port for introducing outer air taken from a separate air intake portion is formed in the cowl front panel when it is located behind a front glass. An air outlet port for sending outer air to a predetermined air-conditioning system is arranged in a bottom-side plate portion of the dash upper panel. Two partition plates are fixed to a portion which corresponds to the air inlet and outlet ports and is present in a space in the dash upper panel. The two partition plates serve as duct-side walls, so that the air inlet and outlet ports communicate with each other in a small space. These partition plates are fixed as follows. That is, a welding margin formed by bending a portion of each partition plate is brought into contact with the inner wall surface of the dash upper panel, and is fixed by, e.g., spot welding.

However, when spot welding is performed while the welding margin is brought into contact with the inner wall surface of the dash upper panel, as described above, one electrode of spot welding must be located on the welding margin of the partition plate located in the dash upper panel, and the other electrode must be located on the outer surface of the dash upper panel. For this reason, it is not easy to automate such welding, resulting in poor warkability in assembly of a duct.

SUMMARY OF THE INVENTION

The present invention has been made in consideration of the above situation, and has as its principal object to provide a front vehicle body structure which can facilitate a bending work of a cowl panel to satisfactorily meet a requirement for increasing a curvature of a front glass.

It is another object of the present invention to provide a front vehicle body structure which can increase holding rigidity of a front glass by a cowl panel.

It is still another object of the present invention to provide a front vehicle body structure which can reduce the weight of a cowl panel and can improve workability in its assembly.

It is still another object of the present invention to provide a front vehicle body structure in which a dash upper panel can be spot-welded to front pillar inner members, thus increasing a joint strength.

It is still another object of the present invention to provide a front vehicle body structure which can allow easy assembly of a duct in an air-conditioning system.

In order to achieve the above objects, in a front vehicle body structure according to a first aspect of the present invention, in which a cowl front panel, which comprises an arcuated glass support portion for supporting a front window glass so that the glass support portion is located behind a dash lower panel at two side portions in a widthwise direction of a vehicle, and is located in front of the dash lower panel at a central portion in the widthwise direction of the vehicle, extends along the widthwise direction of the vehicle in a front portion of the vehicle, the cowl front panel is split into three members including two side split members and one central split member at positions where the glass support portion intersects the dash lower panel, and the two side split portions and one central split member are joined at the intersections.

In the front vehicle body structure according to a second aspect of the present invention, the two side split members and the one central split member of the cowl front panel are joined to each other by spot welding.

In the front vehicle body structure according to a third aspect of the present invention, the side split members of the cowl front panel are joined in advance to inner members of front pillars by spot welding to constitute a subassembly.

With the above structure, since a cowl front panel consists of three separate members, i.e., two side split members and one central split member, glass support portions of the side split members can be bent toward the rear side of a dash lower panel, and a glass support portion of the central split member can be bent toward the front side of the dash lower panel, respectively. More specifically, in this bending work, a work for bending each split member in only one direction need only be performed, and no difficult work is required. Therefore, the glass support portion of the cowl front panel constituted by joining these split members can be relatively easily worked to match with a curved glass.

If the cowl front panel has an integrated structure, when a vehicle crashes, an engine or the like in an engine room is slightly offset backward, and the entire cowl front panel is pushed into a passenger's room. In this case, it is often difficult to hold a glass. However, since the cowl front panel is constituted by split members, it can be designed to have a relatively low joint strength between the two side split members and one central split member. In this case, when a vehicle crashes, the central split member is disengaged from the side split members and is moved backward, while two side split members are substantially fixed in position. As a result, the holding state of the glass can be maintained by the two side split members.

In the front vehicle body structure according to a fourth aspect of the present invention, a dash upper panel joined to the rear surface of the cowl front panel to define a closed space therebetween is split into a total of three members including two side split members and one central split member, and are joined to each other at split positions.

In the front vehicle body structure according to a fifth aspect of the present invention, the two side split members and the one central split member of the dash upper panel are joined to each other by spot welding.

In the front vehicle body structure according to a sixth aspect of the present invention, the side split members of the dash upper panel are joined in advance to inner members of front pillars by spot welding to constitute a subassembly.

In the front vehicle body structure according to a seventh aspect of the present invention, the dash upper panel is split at the same positions as the split positions of the cowl front panel.

With the above-mentioned structure, since the dash upper panel consists of two side split members and one central split member, these split members can be independently transported, thus greatly facilitating transportation as compared to a case wherein an integrated dash upper panel is transported. Of course, since these split members can be worked independently, workability can also be improved.

Since the side split members of the dash upper panel are spot-welded to the inner members of the front pillars, a high joint strength can be assured. In particular, since a stress tends to be concentrated on joint portions between the side split members and the inner members, it is very significant to obtain a high joint strength.

Since spot welding can be performed beforehand between the inner members and the side split members, the front pillars and the side split members constitute subassemblies. Thus, in assembly of respective members in a vehicle body structure, after a dash lower panel is disposed, the subassemblies can be assembled to vehicle body front side portions of the vehicle body, and the central split members of the cowl front panel and the dash upper panel can then be joined. In addition, the central split members can be joined to the side split members by spot welding, thus improving warkability in assembly.

If the front pillars and an integrated dash upper panel constitute a subassembly, since this dash upper panel is relatively large and heavy, it is not easy to support this subassembly by only one front pillar, and it is not easy to transport the subassembly. In contrast to this, according to the structure of the present invention, the dash upper panel is constituted by separate split members, and only the side split members are joined to the inner members in advance. Therefore, since the side split members are relatively small and light, the above-mentioned drawback will not occur.

The front vehicle body structure according to an eighth aspect of the present invention further comprises reinforcement panels, interposed between the side split members and the central split member of the dash upper panel, for partitioning the closed space into two side portions and a central portion.

In the front vehicle body structure according to a ninth aspect of the present invention, the reinforcement panels are joined to the side split members and the central split member of the dash upper panel by spot welding.

With the above-mentioned structure, since reinforcement panels for partitioning a cowl inner space as a closed space into side split member portions and a central split member portion are arranged on joint portions between the side split members and the central split member of the dash upper panel, a given mechanical strength or rigidity can be imparted to the dash upper panel even when the dash upper panel is split into the side split members and the central split member, thus increasing a mechanical strength of the vehicle body.

In the front vehicle body structure according to a tenth aspect of the present invention, an air inlet port is formed in the central split member of the cowl front panel, an air outlet port is formed in the central split member of the dash upper panel, and air introduced from the air inlet port is sent out from the air outlet port via the closed space.

The front vehicle body structure according to an eleventh aspect of the present invention further comprises a duct cover, disposed in the closed space, for causing the air inlet port to communicate with the air outlet port in a small space.

In the front vehicle body structure according to a twelfth aspect of the present invention, one side wall of the duct cover is defined by a corresponding one of the reinforcement panels.

In the front vehicle body structure according to a thirteenth aspect of the present invention, the duct cover is joined to the corresponding one of the reinforcement panels by spot welding.

With the above-mentioned structure, a duct cover can be assembled by clamping the reinforcement panel for defining one side wall of the duct cover between flange-like welding margins of the side and central split members, and joining it to them. The panel and these split members can be joined by spot welding in a clamping state in such a manner that the two flange-like welding margins and the edge portion of the reinforcement panel are clamped between a pair of electrodes. Since the pair of electrodes can be located outside the dash upper panel and need only be moved along an extending direction of the flange-like welding margin, it is easy to automate the spot welding, and duct assembly can be facilitated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A to 8C are sectional views of the front vehicle body structure shown in FIG. 7 taken along lines D—D, E—E, and F—F in FIG. 9, respectively;

DETAILED DESCRIPTION OF THE PREFERRED EMBODIMENTS

A front vehicle body structure according to the first embodiment of the present invention will be described below with reference to FIGS. 1 to 4B.

Figure 1:
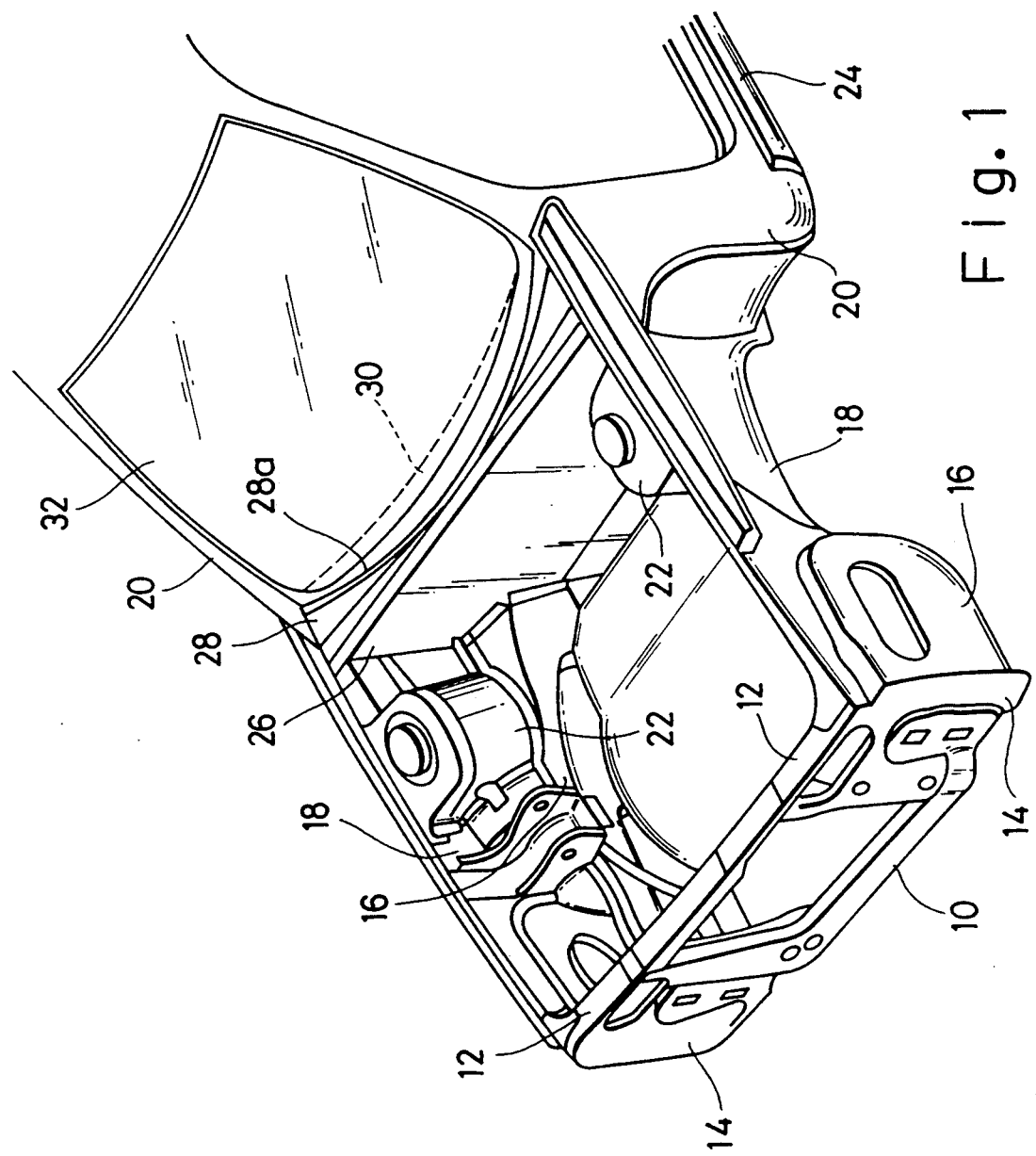
FIG. 1 is a schematic perspective view showing the overall front vehicle body structure to which the first embodiment of the present invention is applied.

As schematically shown in FIG. 1, a front vehicle body structure of the first embodiment comprises a cross member 10 extending in the widthwise direction of a vehicle in a lower front surface portion of a vehicle body, a pair of right and left shroud upper panels 12 joined to both sides of the upper end of the cross member 10, a pair of right and left shroud side panels 14 joined to two sides of the front surface of the cross member 10, a pair of right and left front frames 16 to which distal ends of the shroud side panels 14 are joined, and which extend along the back-and-forth direction of the vehicle body to form two side portions of a front vehicle body portion, a pair of right and left wheel aprons 18, joined to the two front frames 16, for storing right and left front wheels, a pair of right and left front pillars 20 formed to stand upright on rear portions of the wheel aprons 18, a pair of right and left suspension towers 22, joined to the inner surfaces of the wheel aprons 18, for supporting suspension members (not shown), a pair of right and left side sills 24 formed to extend backward from the lower ends of the front pillars 20, a dash lower panel 26 formed at a boundary between a passenger's room and an engine room to partition these rooms, a cowl front panel 28 contiguous with the upper side of the dash lower panel 26, and a dash upper panel 30 contiguous with the cowl front panel 28 to extend backward.

The dash lower panel 26 is formed of a single flat plate disposed near toes of passengers sitting on front seats. The dash lower panel 26 extends in the widthwise direction of the vehicle to partition the engine room and the passenger's room.

Figure 2A:
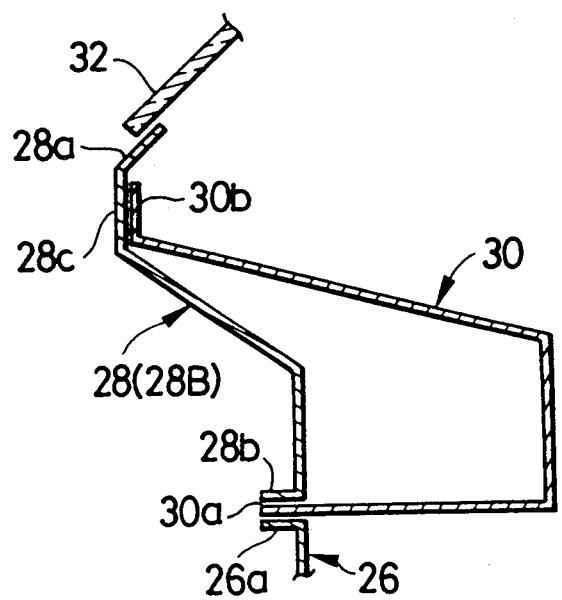
FIG. 2A is a sectional view of the front vehicle body structure shown in FIG. 1 taken along a line A—A in FIG. 3.

The cowl front panel 28 extends in the widthwise direction of the vehicle on the dash lower panel 26. The cowl front panel 28 supports a lower edge portion of a front glass 32 at its arcuated glass support portion 28a formed on its upper edge portion. More specifically, the lower edge portion of the front glass 32 is adhered onto a surface, outside the vehicle, of the glass support portion 28a via an adhesive having a seal function, thereby supporting and mounting the lower edge portion of the front glass 32. In order to support a front glass 32 having a large curvature, two side portions of the glass support portion 28a are formed to be located behind the dash lower panel 26, as shown in FIG. 2C, and its central portion is formed to be located in front of the dash lower panel 26, as shown in FIG. 2A.

Figure 2B:
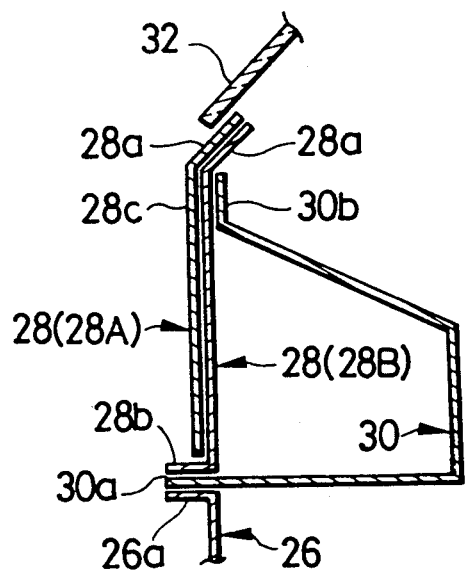
FIG. 2B is a sectional view of the front vehicle body structure shown in FIG. 1 taken along a line B—B in FIG. 3.
Figure 2C:
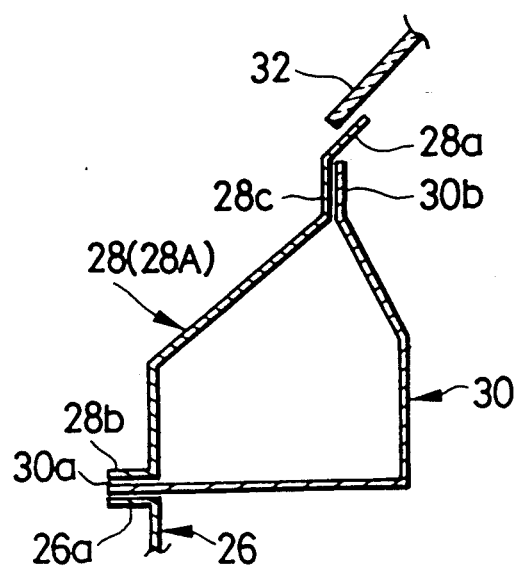
FIG. 2C is a sectional view of the front vehicle body structure shown in FIG. 1 taken along a line C—C in FIG. 3.

As shown in FIG. 2B, the cowl front panel 28 is vertically split at boundary positions where the glass support portion 28a extends forward or backward with respect to the dash lower panel 26 (intersections between the glass support portion 28a and the dash lower panel 26 when viewed from the top). Thus, the cowl front panel 28 is constituted by three members, i.e., two side split members 28A (only one is illustrated), and one central split member 28B.

Figure 3:
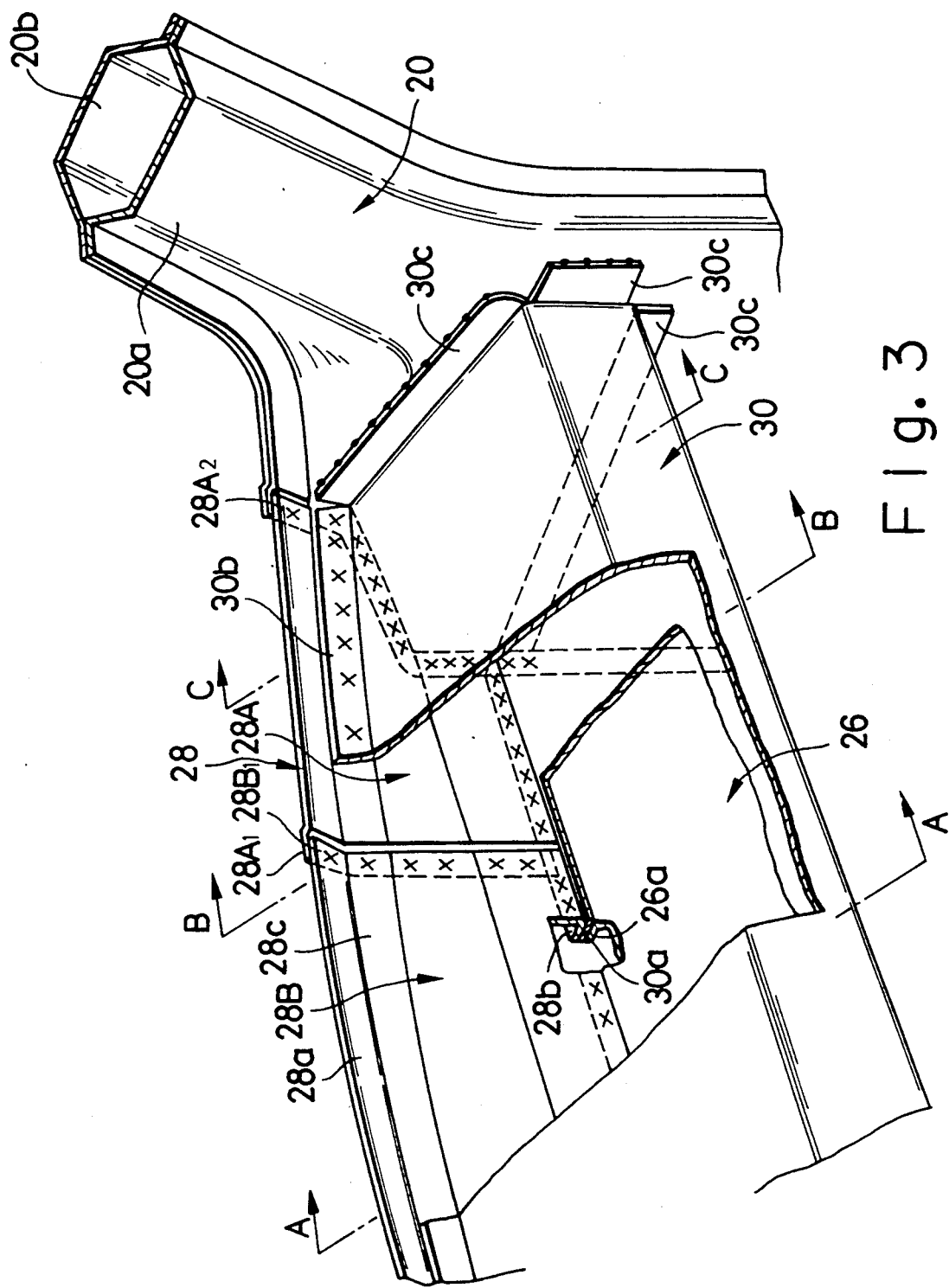
FIG. 3 is a partially cutaway perspective view of a main part of the front vehicle body structure of the first embodiment.

The dash upper panel 30 extends in the widthwise direction of the vehicle between the pair of front pillars 20 standing upright on the side portions of the vehicle body, as shown in FIG. 3. The dash upper panel 30 is joined to the rear surface of the cowl front panel 28 to form a closed space therebetween.

As is apparent from FIG. 3, in each front pillar 20, an inner member 20a and an outer member 20b are joined to each other to form a closed space.

Joint operations of these panels 26, 28, and 30, joint operations of the split members in the cowl front panel 28, and joint operations of the panels 26, 28, and 30 and other vehicle body constituting members are attained by spot welding by overlapping or contacting welding margins formed at, e.g., their edge portions.

A bent portion 26a which is bent toward the engine room is formed on the upper edge portion of the dash lower panel 26, as shown in FIGS. 2A to 2C, and FIG. 3. This bent portion 26a constitutes a welding margin. A bent portion 28b which is bent toward the engine room is also formed on the lower edge portion of the cowl front panel 28. This bent portion 28b constitutes a welding margin. A welding margin 30a at the lower edge of the dash upper panel 30 is interposed between these welding margins 26a and 28b. These three welding margins 26a, 28b, and 30a are fixed to each other by spot welding while overlapping each other.

As shown in FIG. 3, an upright portion 28c located below the glass support portion 28a of the cowl front panel 28 constitutes a welding margin. A welding margin 30b at an upper edge of the dash upper panel 30 is in contact with the welding margin 28c. These welding margins 28c and 30b are fixed to each other by spot welding while overlapping each other.

Each side split member 28A and the central split member 28B of the cowl front panel 28 are fixed to each other by spot-welding welding margins $28A_1$ and $28B_1$ formed on portions corresponding to the above-mentioned boundary positions while overlapping each other, as shown in FIG. 2B. A welding margin $28A_2$ at an edge side of each side split member 28A is in contact with the corresponding wheel apron 18 as a side frame member of the vehicle body. This welding margin $28A_2$ is fixed to the frame member 18 by spot welding.

Flange-like welding margins 30c are integrally formed on two edge portions of the dash upper panel 30. These welding margins 30c are in contact with the inner members 20a of the front pillars 20. In the first embodiment, the dash upper panel 30 is formed to have a length corresponding to the width of the vehicle body. As a result, the welding margin 30c cannot be spot-welded to the corresponding inner member 20a after it is brought into contact with the inner member 20a. Therefore, the welding margin 30c is fixed to the inner member 20a by fillet welding.

According to the structure of the first embodiment described above, since the cowl front panel 28 is constituted by the two side split members 28A and one central split member 28B, the glass support portion 28a of each side split member 28A can be bent behind the dash lower panel 26, and the glass support portion 28a of the central split member 28B can be bent in front of the dash lower panel 26. That is, each of these split members 28A and 28B need only be bent in one direction and requires no difficult bending work. In this manner, in the cowl front panel 28 constituted by joining these split members 28A and 28B, the glass support portions 28a can be relatively easily and precisely formed to match with the curved front glass 32.

If a cowl front panel is constituted by an integrated structure like in a conventional one, when a vehicle crashes head-on, an engine or the like in an engine room is slightly offset backward, and the entire cowl front panel is pushed into a passenger's room. In this case, it is often difficult to hold a glass. However, since the cowl front panel 28 is split into some members in the first embodiment, the following countermeasure can be taken. For example, the two side split members 28A and one central split member 28B are designed to have a relatively low joint strength. As a result, when a vehicle crashes, the central split member 28B is disengaged from the side split members 28A and is solely moved backward, while two side split members 28A are substantially left in position. As a result, the holding state of the front glass 32 can be maintained by the two side split members 28A.

In the first embodiment described above, the edge-side welding margin $28A_2$ of each side split member 28A is in contact with the corresponding wheel apron 18 as a side frame member of the vehicle body, and is fixed to the frame member 18 by spot welding. In the first embodiment, the edge-side welding margin $28A_2$ need not always be solely mounted on the wheel apron 18. For example, a modification of the first embodiment shown in FIGS. 4A and 4B is available.

Figure 4A:
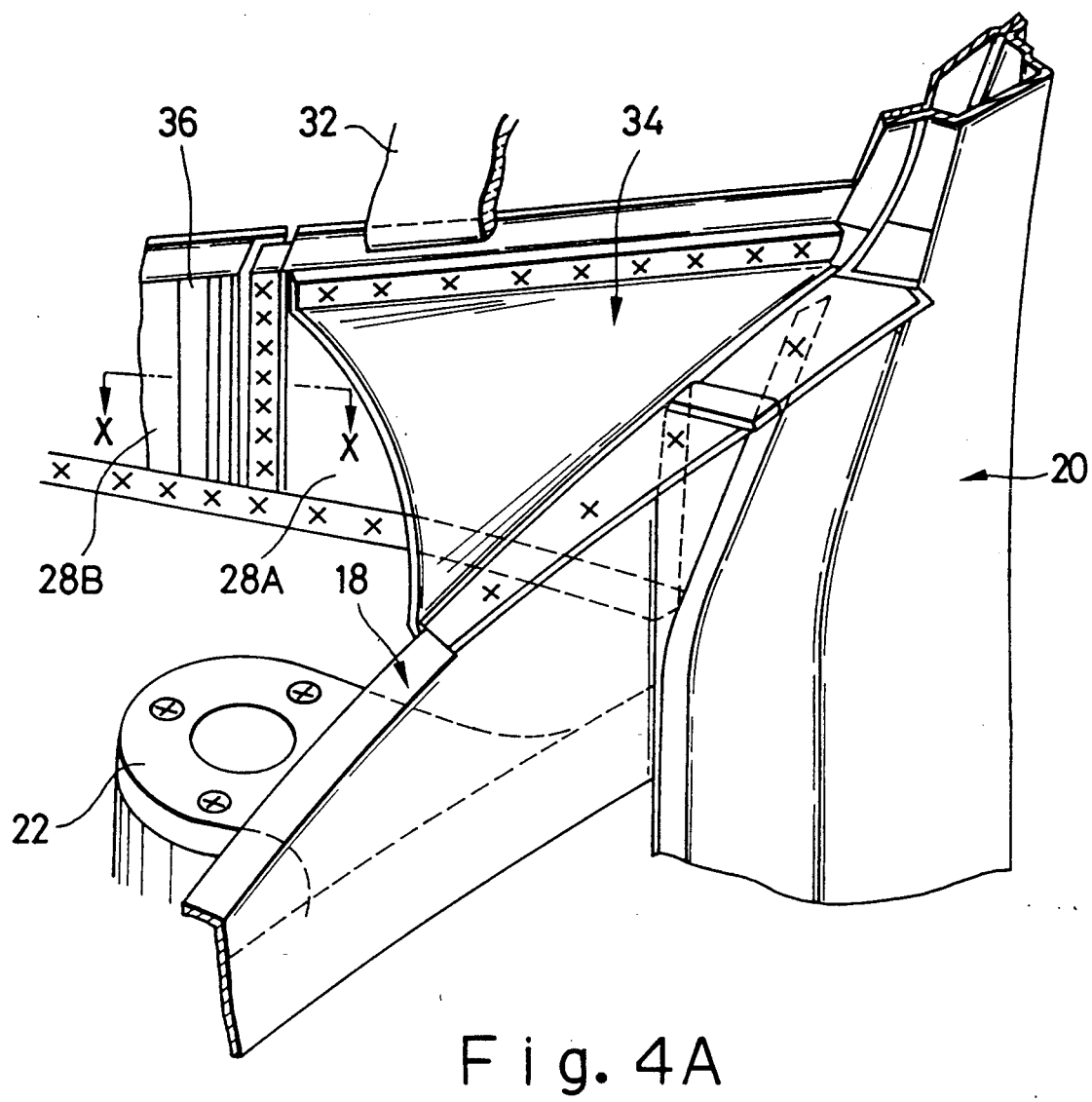
FIG. 4A is a perspective view showing a main part of the front vehicle body structure according to a modification of the first embodiment.
Figure 4B:
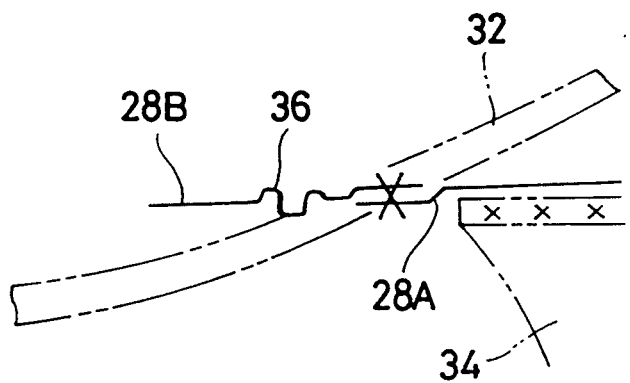
FIG. 4B is a view showing the main part of the front vehicle body structure shown in FIG. 4A when viewed along a line X—X in FIG. 4A.

In this modification, as shown in FIGS. 4A and 4B, a substantially triangular gusset (reinforcement member) 34 is fixed to extend between each side split member 28A and the wheel apron 18 as the side frame member of the vehicle body. In this manner, rigidity around the front suspensions is improved. On the other hand, an expansion margin 36 is locally formed on the central split member 28B. In this manner, the central split member 28B can be easily deformed against a load in the back-and-forth direction of the vehicle body.

Since the modification of the first embodiment is constituted as described above, when a vehicle crashes, only the central split member 28B is deformed while being pushed by, e.g., an engine, while the two side split members 28A are securely joined to the wheel aprons 18 via the gussets 34 and are substantially fixed in position. As a result, a holding state of the front glass 32 can be reliably maintained by the two side split members 28A. More specifically, according to this modification, a front glass support function upon crashing can be guaranteed while improving rigidity around the front suspensions.

It is not easy to form the expansion margin 36 of this modification on a cowl front panel having an integrated structure like in a conventional structure since this cowl front panel is large, and its shape is complex. However, since it is relatively easy to form the expansion margin 36 on the central split member 38B, design for taking a countermeasure against crashing does not disturb mass-productivity.

As described above, in the front vehicle body structure according to the first embodiment, the cowl front panel 28 is split into three members at boundary positions where the glass support portion 28a of the cowl front panel 28 extends forward or backward with respect to the dash lower panel 26, i.e., is constituted by three different members 28A, 28B, and 28A. In addition, the two side split members 28A and one central split member 28B are joined at the above-mentioned boundary positions.

Thus, in the cowl front panel 28 constituted by joining the split members, the glass support portions 28a can be relatively easily and precisely matched with a large curvature of the curved front glass. In addition, design for attaining two requirements for assuring a glass support function upon crashing and improving rigidity of a vehicle body can be relatively easily performed.

The present invention is not limited to the structure of the first embodiment, and various changes and modifications may be made within the spirit and scope of the invention. Structures of various embodiments of the present invention will be described below with reference to corresponding drawings. The same reference numerals as in the first embodiment denote the same parts throughout the following description of the various embodiments, and a detailed description thereof will be omitted.

More specifically, the first embodiment described above employs a structure wherein the cowl front panel 28 is vertically split into three members to be constituted by three different members, and the two side split members 28A and one central split member 28B are joined at the above-mentioned boundary positions In the first embodiment, the dash upper panel 30 is formed to have a length corresponding to the width of the vehicle body. However, the present invention is not limited to this, and the dash upper panel 30 may be vertically split into three members to be constituted by three different members 30A, 30B, and 30A, as will be described below in the second embodiment.

Figure 5:
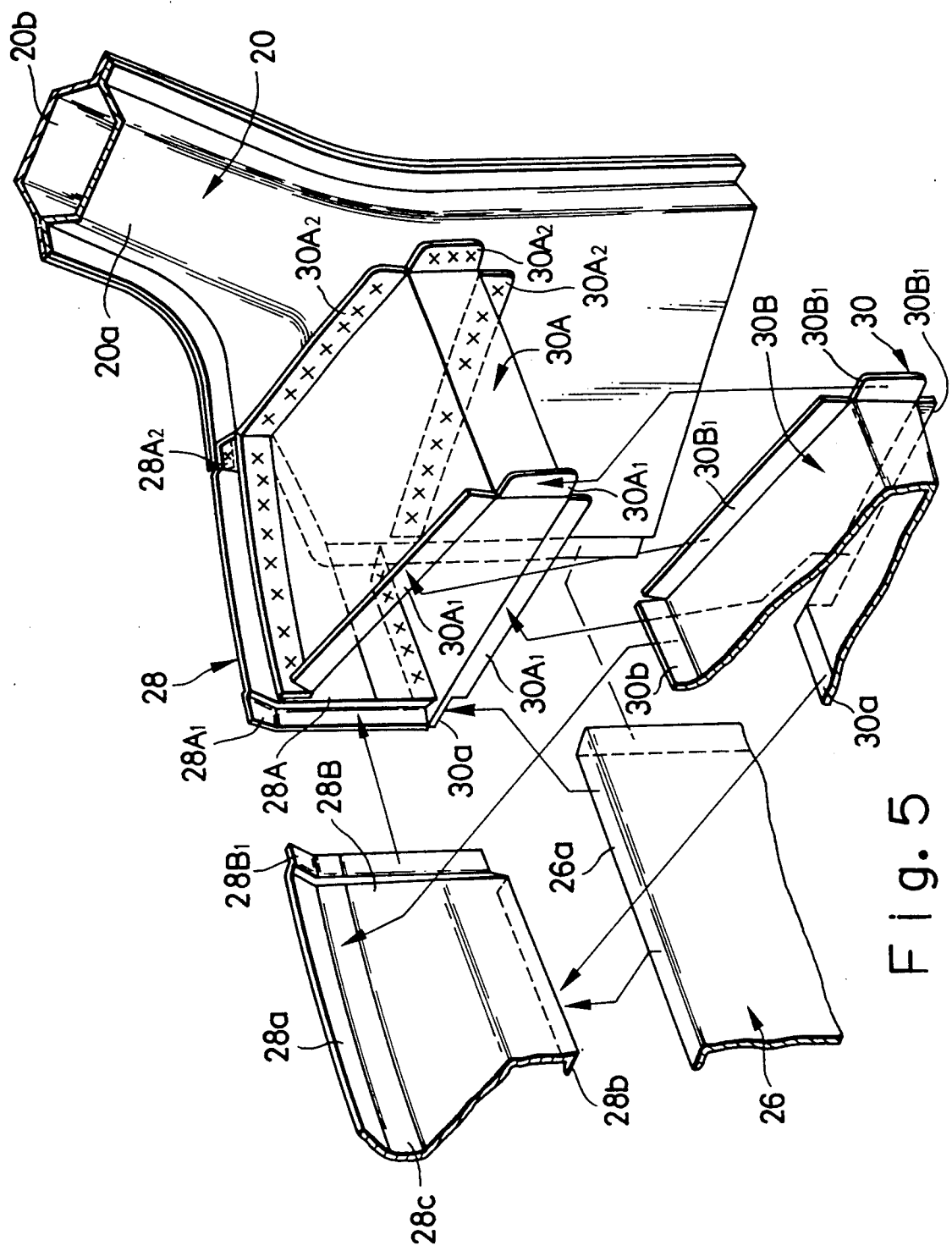
FIG. 5 is an exploded perspective view of the main part of a front vehicle body structure according to the second embodiment of the present invention.
Figure 6:
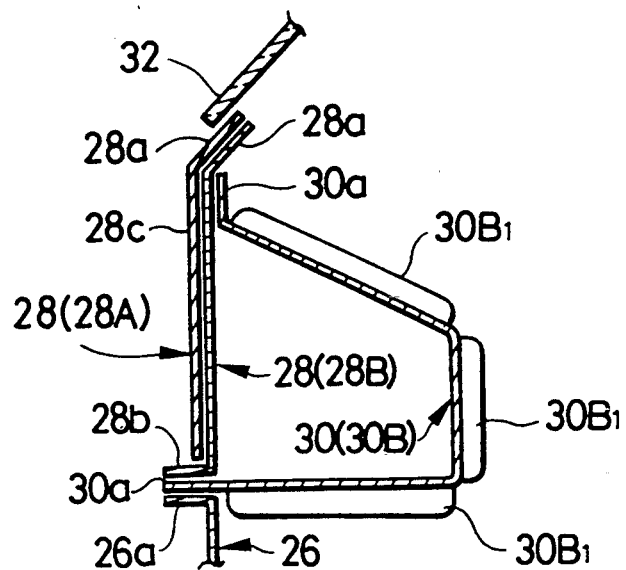
FIG. 6 is a sectional view showing a joint state of side split members in a cowl front panel and a dash upper panel in the front vehicle body structure shown in FIG. 5.

The second embodiment will be described below with reference to FIGS. 5 and 6.

More specifically, in the second embodiment, a dash upper panel 30 is constituted by three separate members, i.e., two side split members 30A (only one is illustrated), and one central split member 30B like the cowl front panel 28. Although split positions are not particularly limited, the dash upper panel 30 is split at positions corresponding to those of the cowl front panel 28 in the second embodiment.

The two side split members 30A and the central split member 30B of the dash upper panel 30 are fixed to each other in such a manner that flange-like welding margins $30A_1$ and $30B_1$ formed at their side edge portions are brought into contact with each other, and are spot-welded. An edge-side welding margin $30A_2$ of each side split member 30A is arranged to be in contact with an inner member 20a of each front pillar 20. Each side split member 30A is joined in advance to the corresponding inner member 20a by spot welding, thus constituting a subassembly. In the second embodiment, since the cowl front panel 28 also has a split structure, this structure is equivalent to a structure wherein a so-called cowl box is split into three pieces at the central and side portions. Each side split member 28A of the cowl front panel 28, the corresponding side split member 30A of the dash upper panel 30, and the corresponding front pillar 20 constitute a subassembly.

According to the front vehicle body structure of the second embodiment, since the dash upper panel 30 is constituted by three different members, i.e., two side split members 30A and one central split member 30B, these split members can be independently transported, and transportation of the dash upper panel can be greatly facilitated as compared to that of a conventional integral dash upper panel. Of course, since these split members can be independently worked, the work can also be facilitated.

Since the side split member 30A of the dash upper panel 30 and the inner member 20a of the corresponding front pillar 20 can be joined by spot welding, a high joint strength can be obtained. In particular, since a stress tends to be concentrated on a joint portion between the side split member 30A and the inner member 20a, it is very significant to obtain such a high joint strength.

The spot welding can be performed in advance between the inner member 20a and the side split member 30A. In the second embodiment, the side split member 28A is also spot-welded in advance to the corresponding inner member 20a, so that the front pillar 20 and the side split members 28A and 30A constitute a subassembly. In assembly of respective members in this vehicle body structure, after the dash lower panel 26 is disposed, the above-mentioned subassemblies are assembled to a vehicle body from its side portions, and the central split member 28B of the cowl front panel 28 and, then, the central split member 30B of the dash upper panel 30 can be joined. When the central split member 30B is joined to the side split members 30A, spot welding can be performed on the plurality of flange-like welding margins $30A_1$ and $30B_1$, thus facilitating assembly.

If the front pillars 20 and a conventional integral dash upper panel constitute a subassembly like in this embodiment, since the dash upper panel is relatively large and heavy, it is not easy to support the dash upper panel by one front pillar. Transportation of this subassembly is not easy, either, resulting in many drawbacks. In contrast to this, according to the structure of the second embodiment, the above-mentioned drawbacks will not occur since the cowl front panel 28 and the dash upper panel 30 are respectively constituted by three different members and the side split members 28A and 30A are joined to the inner members 20a of the corresponding front pillars beforehand and are relatively small and light.

As described in detail above, the front vehicle body structure according to the present invention employs the following structure. That is, the dash upper panel 30 is constituted by different members, i.e., the two side split members 30A and the central split member 30B, and these members are joined to each other by welding. In addition, the side split members 30A and the inner members 20a of the corresponding front pillars 20 are joined beforehand by spot welding, thus constituting subassemblies.

Thus, workability and transportability of the three split members 30A and 30B of the dash upper panel can be improved, and easy assembly of the respective members and a high vehicle body rigidity can also be assured.

In the second embodiment described above, the three split members 30A, 30B, and 30A of the dash upper panel 30 are joined by spot welding via their welding margins $30A_1$ and $30B_1$. However, the present invention is not limited to this structure. For example, the three split members 30A, 30B, and 30A may be joined to each other via reinforcement panels 38, as will be described in the third embodiment below.

Figure 7:
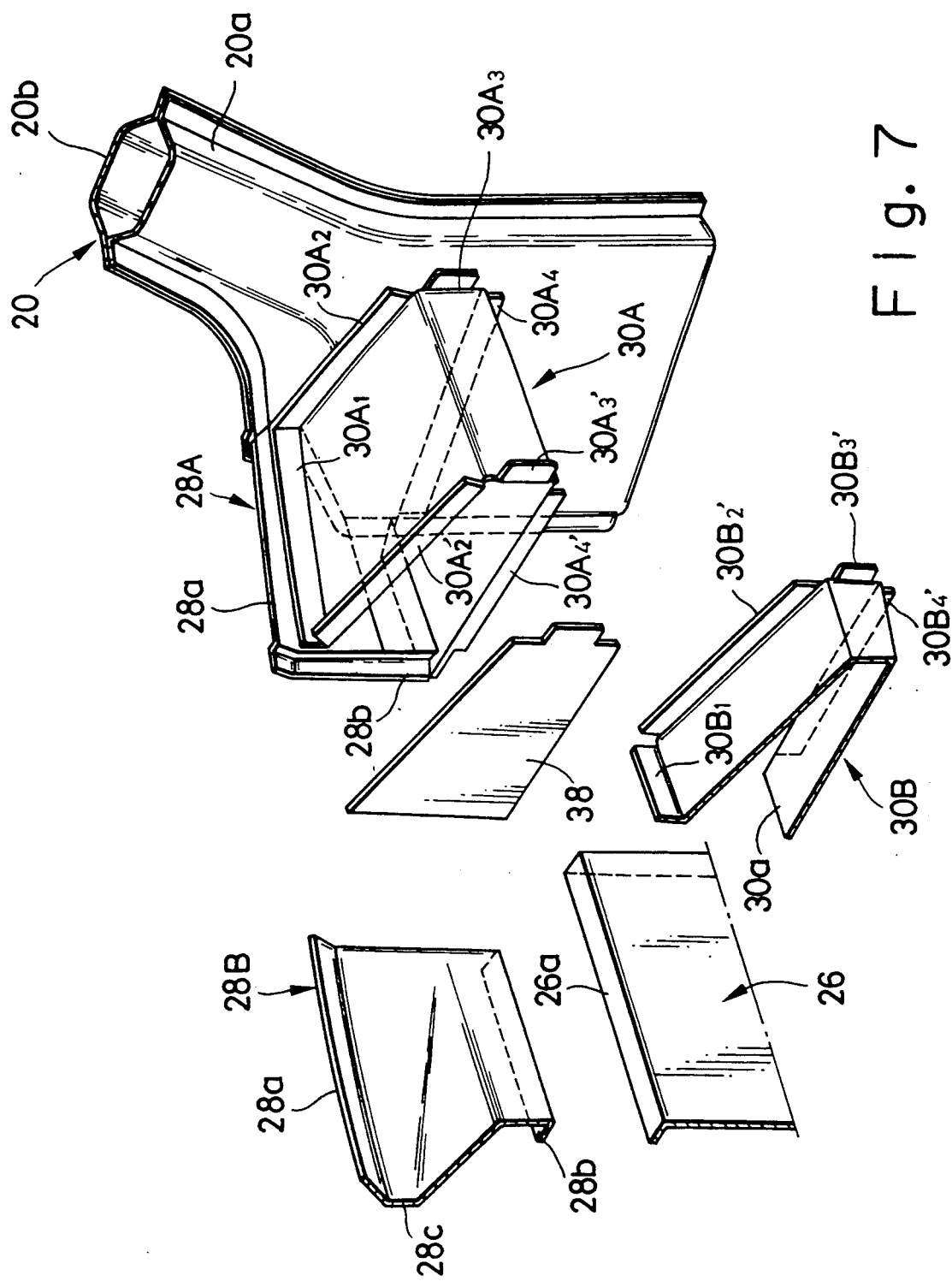
FIG. 7 is an exploded perspective view of a main part of a front vehicle body structure according to the third embodiment of the present invention.
Figure 9:
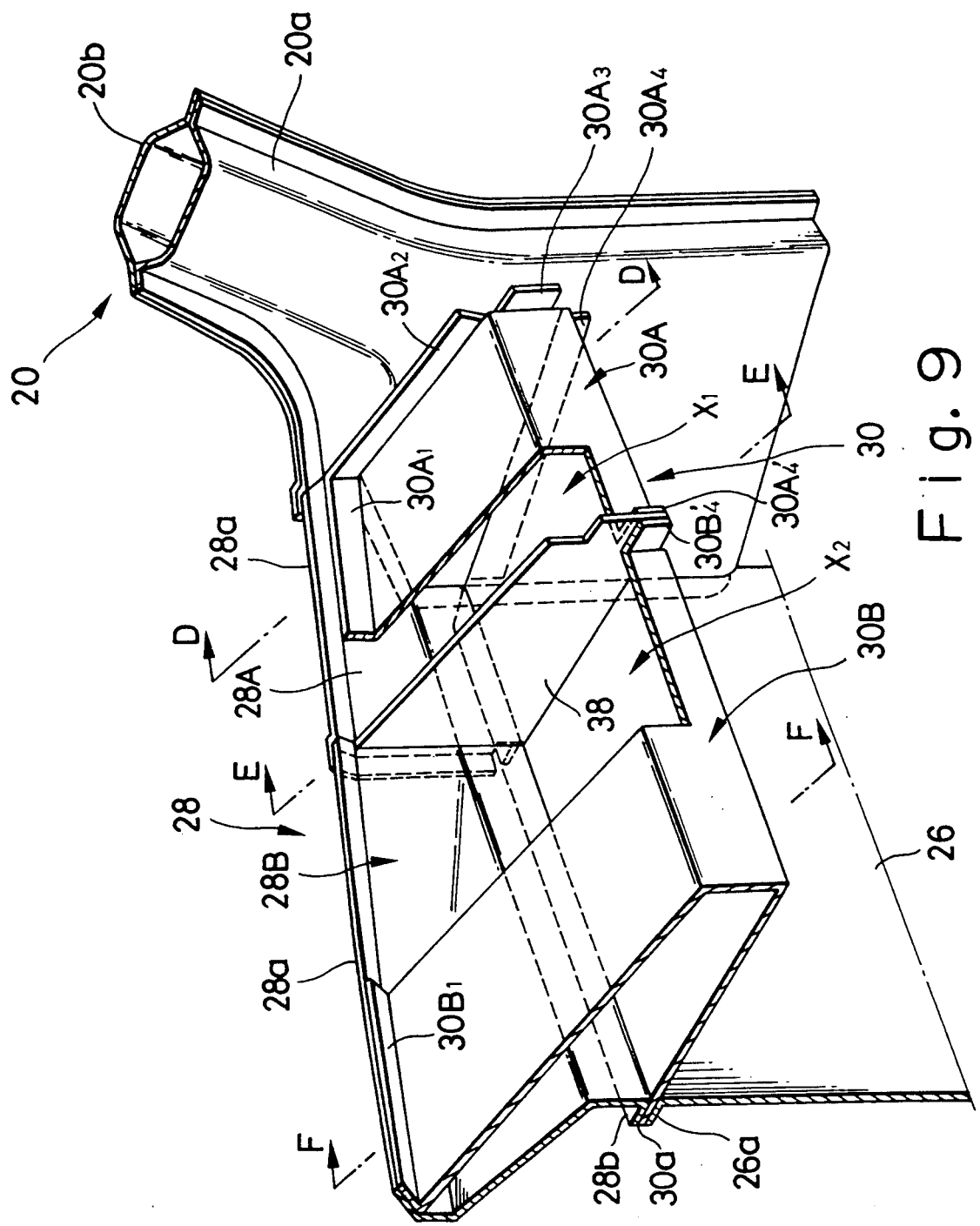
FIG. 9 is a perspective view showing an assembled state of the front vehicle body structure shown in FIG. 7.

The third embodiment will be described below with reference to FIGS. 7 to 9.

In the third embodiment, a cowl front panel 28 is constituted by two side split members 28A and one central split member 28B, and a dash upper panel 30 is also constituted by two side split members 30A and one central split member 30B. A flange-like welding margin $30A_1$ to be joined to the corresponding side split member 28A of the cowl front panel 28 is formed on each side split member 30A. Flange-like welding margins $30A_2, 30A_3, 30A_4, 30A_2', 30A_3',$ and $30A_4'$ to be joined to an inner member 22a of each front pillar 22, and the central split member 30B are respectively formed on two side portions of each side split member 30A.

A welding margin $30B_1$ to be joined to a flange-like welding margin $28B_1$ of the central split member 28B of the cowl front panel 28 is formed on the central split member 30B of the dash upper panel 30. Welding margins $30B_2', 30B_3',$ and $30B_4'$ to be joined to the welding margins $30A_2', 30A_3',$ and $30A_4'$ of each side split member 30A through a reinforcement panel 38 (to be described later) are formed on the two side portions of the central split member 30B.

As shown in FIG. 8A, a side closed space $X_1$ is defined by a space surrounded by the side split members 28A and 30A. As shown in FIG. 8C, a central closed space $X_2$ is defined by a space surrounded by the central split members 28B and 30B. These closed spaces $X_1$ and $X_2$ are partitioned by the reinforcement panel 38. More specifically, the reinforcement panel 38 is clamped between the welding margins $30A_2'$, $30A_3'$, and $30A_4'$ of the side split member 30A, and the welding margins $30B_2'$, $30B_3'$, and $30B_4'$ of the central split member 30B, and is joined thereto by spot welding.

Each front pillar 22 is constituted by joining the inner member 22a and an outer member 22b to define a closed space. The side split members 28A and 30A are joined to the inner surface of the inner member 22a by, e.g., spot welding.

In this manner, in the third embodiment, the reinforcement panel 38 for partitioning a cowl section into the side and central closed spaces $X_1$ and $X_2$ is arranged at the joint portion between the side split members 28A and 30A, and the central split members 28B and 30B. As a result, when the cowl portion is split into the side split members 28A and 30A, and the central split members 28B and 30B, a desired mechanical strength and rigidity can be imparted to this cowl portion, thus increasing a mechanical strength of the vehicle body.

As described above, in the front vehicle body structure according to the third embodiment, the constituting members 28 and 30 of the cowl portion which is formed along the lower edge portion of a front window glass 32 and two side portions of which are joined to the right and left front pillars 20 are split into the side split members 28A and 30A joined to the front pillars 20 and the central split members 28B and 30B whose two side portions are joined to these side split members 28A and 30A. For example, the side split members 28A and 30A of the constituting members 28 and 30 of the cowl portion are joined to the right and left front pillars 20, and then, the central split members 28B and 30B of the cowl constituting members are joined to the corresponding side split members 28A and 30A to assemble the cowl portion. In this manner, easy assembly of the cowl portion and members around it can be assured.

Since the constituting members 28 and 30 of the cowl portion are split into the side split members 28A and 30A and the central split members 28B and 30B, these members can be independently worked, resulting in easy molding. Thus, the cowl portion can be easily molded to match with the shape of the front window glass 32 having, e.g., a large curvature.

Furthermore, since the reinforcement panel 38 for partitioning a cowl section as a closed section into a portion on the side of the side split members 28A and 30A and a portion on the side of the central split members 28B and 30B is arranged at the joint portion between the side split members 28A and 30A and the central split members 28B and 30B of the cowl constituting portion, a given mechanical strength and rigidity can be imparted to the cowl portion even when the cowl portion is formed by split constituting members, e.g., the side split members 28A and 30A and the central split members 28B and 30B, thus increasing a mechanical strength of the vehicle body.

In the first to third embodiments described above, a closed space defined by the cowl front panel 28 and the dash upper panel 30 has only a function of increasing a rigidity of the vehicle body. However, the present invention is not limited to this structure. For example, this closed space may serve as an air introduction path for introducing outer air from an air intake portion (not shown) to an air-conditioning system (not shown), as will be described in the fourth embodiment below.

Figure 11:
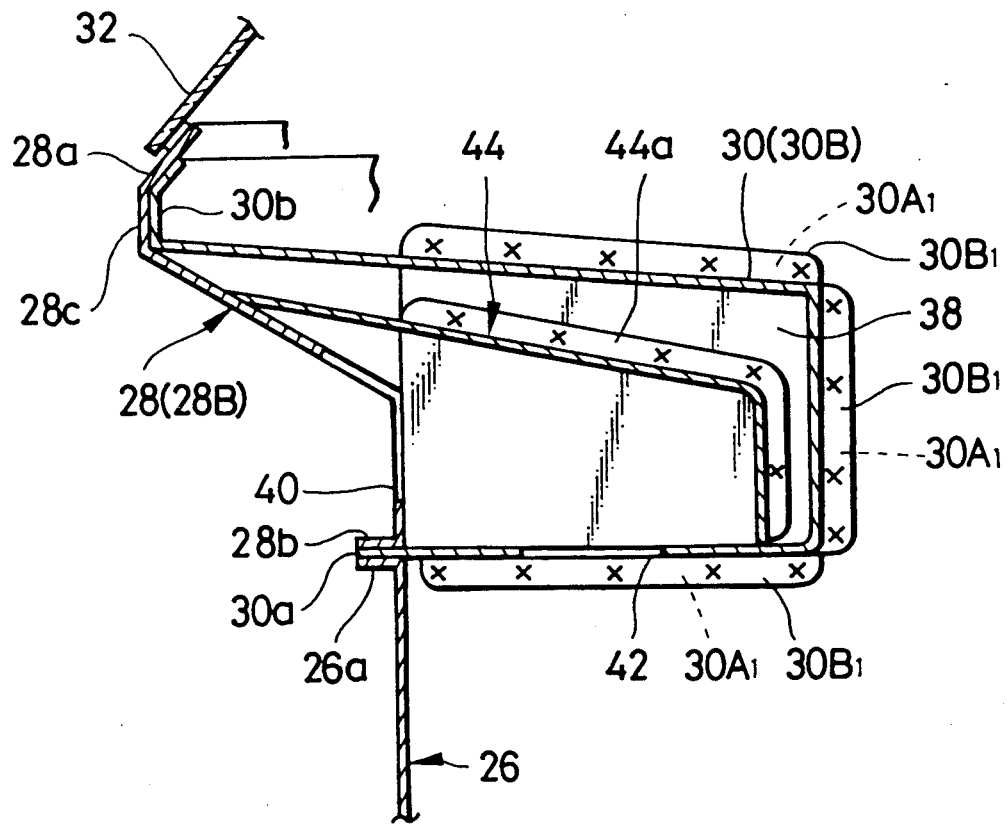
FIG. 11 is a sectional view of the front vehicle body structure shown in FIG. 10 taken along a line G—G in FIG. 10.
Figure 10:
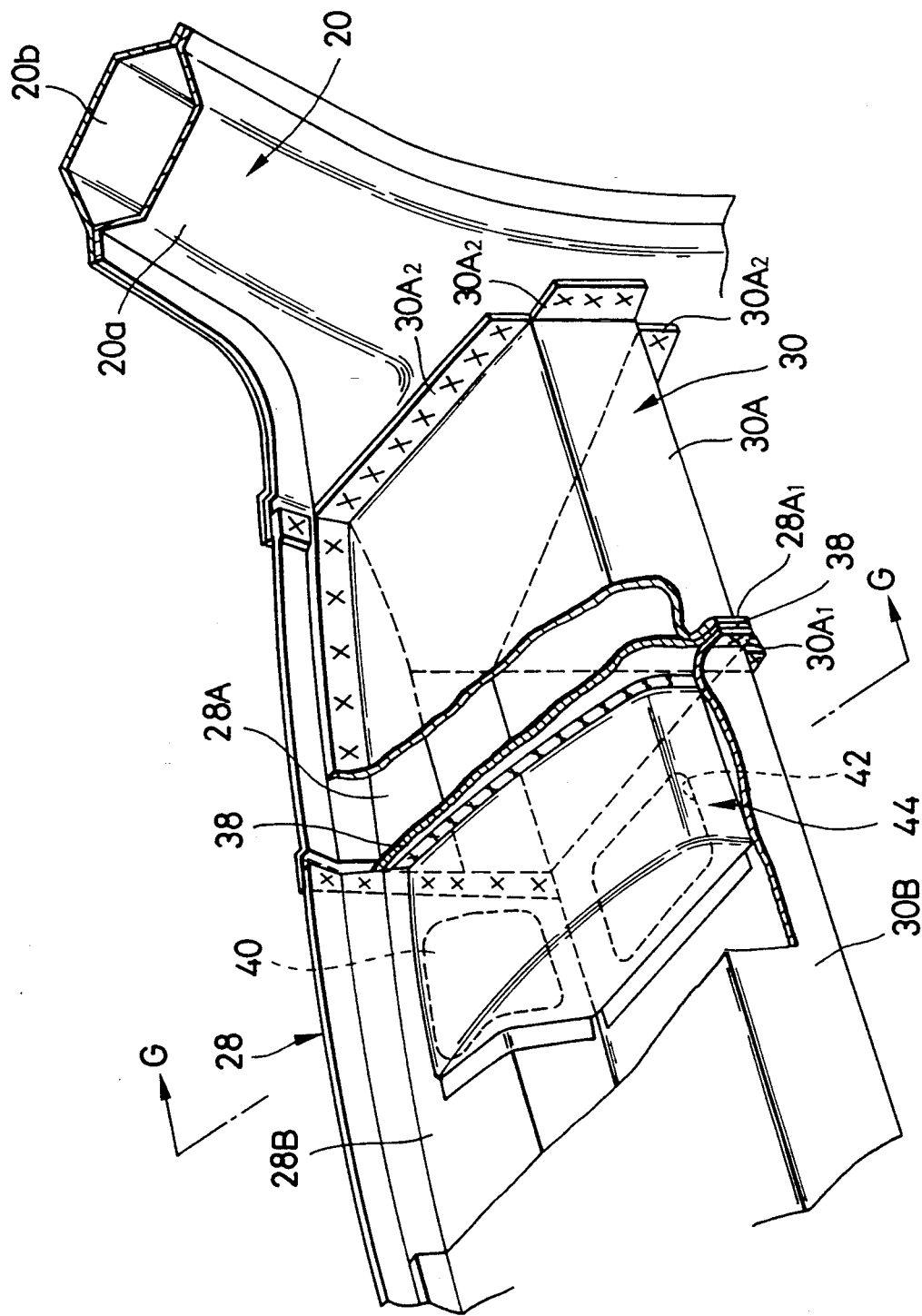
FIG. 10 is a perspective view of the main part of a front vehicle body structure according to the fourth embodiment of the present invention.

The fourth embodiment will be described below with reference to FIGS. 10 and 11.

In the fourth embodiment, basically, each of a cowl front panel 28 and a dash upper panel 30 is constituted by three independent members, i.e., two side split members 28A or 30A, and one central split member 28B or 30B, and these members are joined by welding like in the second embodiment described above.

In the fourth embodiment, an air inlet port 40 for introducing outer air taken from a separate air intake portion (not shown) is formed in the central split member 28B of the cowl front panel 28. An air outlet port 42 for sending outer air guided by the air inlet port 40 to a predetermined air-conditioning system (not shown) is formed in a bottom plate portion of the central split member 30B of the dash upper panel 30.

A duct cover 44 is disposed in the central split member 30B to cause the air intake port 40 to communicate with the air outlet port 42 in a small closed space. One side wall of the duct cover 44 is defined by a reinforcement panel 38 for vertically partitioning a space in the dash upper panel 30. More specifically, the reinforcement panel 38 is clamped between a flange-like welding margin $30A_1$ of each side split member 30A and a flange-like welding margin $30B_1$ of the central split member 30B, and is joined thereto.

Joint operations of these panels 26, 28, and 30, joint operations of the split members of the cowl front panel 28 and the dash upper panel 30, joint operations of the split members of the dash upper panel 30 and the reinforcement panel 38, and joint operations of the reinforcement panel 38 and the duct cover 44, and joint operations of the panels 26, 28, and 30, and other vehicle body constituting members are attained by spot welding while overlapping or contacting their welding margins formed at, e.g., their edge portions.

The reinforcement panel 38 and the duct cover 44 are fixed to each other by spot welding while a welding margin 44a of the duct cover 44 is brought into contact with a surrounding edge portion of the reinforcement panel 38 so as not to interfere with each other. A plurality of edge-side welding margins $30A_2$ of each side split member 30A are in contact with an inner member 20a of a corresponding front pillar 20. These edge-side welding margins $30A_2$ are joined in advance to the corresponding inner member 20a by spot welding, thus constituting a subassembly.

In the fourth embodiment, since the cowl front panel 28 also has a split structure like in the second embodiment described above, this structure is equivalent to a structure wherein a so-called cowl box is split into three pieces at central and side portions. Each side split member 28A of the cowl front panel 28, the corresponding side split member 30A of the dash upper panel 30, and the inner member 20a of the corresponding front pillar 20 constitute a subassembly.

In assembly of the respective members in this vehicle body structure, after the dash lower panel 26 is disposed, the above-mentioned subassemblies are assembled to a vehicle body from its side portions. Meanwhile, the duct cover 44 is joined beforehand to each reinforcement panel 38. Each duct cover 44 with the reinforcement panel 38 is temporarily joined in the central split member 30B of the dash upper panel 30 by, e.g., spot welding. Thereafter, the central split member 28B of the cowl front panel 28 and the central split member 30B to which the duct cover 44 is assembled in advance are joined to each other. When the central split member 30B is joined to the side split members 30A, the reinforcement panel 38 is simultaneously joined.

In this manner, the duct cover 44 is assembled in such a manner that the reinforcement panel 38 is clamped between the flange-like welding margin $30A_1$ of the side split member 30A and the flange-like welding margin $30B_1$ of the central split member 30B and is joined thereto. In a joint operation in this clamped state, the two flange-like welding margins $30A_1$ and $30B_1$, and the surrounding edge portion of the reinforcement panel 38 are clamped between a pair of electrodes and are then spot-welded. Both the electrodes are located outside the dash upper panel 30, and can be moved along the extending direction of the flange-like welding margins $30A_1$ and $30B_1$. In this manner, spot welding can be easily automated, thus assuring easy assembly of a duct.

Of course, since the cowl front panel 28 and the dash upper panel 30 have split structures, easy transportation and improved workability can be attained.

As described above, in the front vehicle body structure according to the fourth embodiment, at least the dash upper panel 30 is constituted by three independent members, i.e., the two side split members 30A and one central split member 30B, and one side wall of the duct cover 44 which causes the air inlet port 40 formed in the cowl front panel 28 to communicate with the air outlet port 42 formed in the central split member 30B of the dash upper panel 30 in a small closed space is defined by the reinforcement panel 38 for vertically partitioning this closed space. This reinforcement panel 38 is clamped between the flange-like welding margin $30A_1$ of the side split member 30A and the flange-like welding margin $30B_1$ of the central split member 30B and is joined thereto.

According to the fourth embodiment, easy assembly of a duct can be assured.

As many apparently widely different embodiments of the present invention can be made without departing from the spirit and scope thereof, it is to be understood that the invention is not limited to the specific embodiments thereof except as defined in the appended claims.

What is claimed is:

1. A front vehicle body structure in which a cowl front panel, which comprises an arcuated glass support portion for supporting a front window glass so that said glass support portion is located behind a dash lower panel at two side portions in a widthwise direction of a vehicle, and is located in front of said dash lower panel at a central portion in the widthwise direction of the vehicle, extends along the widthwise direction of the vehicle in a front portion of the vehicle,
   wherein said cowl front panel is split into three members including two side split members and one central split member at positions where said glass support portion intersects said dash lower panel, and
   said two side split portions and said one central split member are joined at the intersections.

2. The structure according to claim 1, wherein said two side split members and said one central split member of said cowl front panel are joined to each other by spot welding.

3. The structure according to claim 2, wherein said side split members of said cowl front panel are joined in advance to inner members of front pillars by spot welding to constitute a subassembly.

4. The structure according to claim 1, further comprising:
   a dash upper panel joined to a rear surface of said cowl front panel to define a closed space therebetween.

5. The structure according to claim 4, wherein said dash upper panel is formed to extend over a substantially total width of the vehicle.

6. The structure according to claim 5, wherein two ends of said dash upper panel are joined to a pair of right and left front pillars by fillet welding.

7. The structure according to claim 4, wherein said dash upper panel is split into a total of three members including two side split members and one central split member, and are joined to each other at split positions.

8. The structure according to claim 7, wherein said two side split members and said one central split member of said dash upper panel are joined to each other by spot welding.

9. The structure according to claim 7, wherein said side split members of said dash upper panel are joined in advance to inner members of front pillars by spot welding to constitute a subassembly.

10. The structure according to claim 7, wherein said dash upper panel is split at the same positions as the split positions of said cowl front panel.

11. The structure according to claim 7, characterized by further comprising:
    reinforcement panels, interposed between said side split members and said central split member of said dash upper panel, for partitioning the closed space into two side portions and a central portion.

12. The structure according to claim 11, wherein said reinforcement panels are joined to said side split members and said central split member of said dash upper panel by spot welding.

13. The structure according to claim 7, wherein an air inlet port is formed in said central split member of said cowl front panel,
    an air outlet port is formed in said central split member of said dash upper panel, and
    air introduced from said air inlet port is sent out from said air outlet port via the closed space.

14. The structure according to claim 13, further comprising:
    a duct cover, disposed in the closed space, for causing said air inlet port to communicate with said air outlet port in a small space.

15. The structure according to claim 14, further comprising:
    reinforcement panels, interposed between said side split members and said central split member of said dash upper panel, for partitioning the closed space into two side portions and a central portion.

16. The structure according to claim 15, wherein one side wall of said duct cover is defined by a corresponding one of said reinforcement panels.

17. The structure according to claim 16, wherein said reinforcement panels are clamped between said side split members and said central split member, and are joined thereto.

18. The structure according to claim 16, wherein said duct cover is joined to the corresponding one of said reinforcement panels by spot welding.

* * * * *